(12) United States Patent
Esseghir et al.

(10) Patent No.: US 12,142,395 B2
(45) Date of Patent: Nov. 12, 2024

(54) POLYMERIC COMPOUNDS FOR CABLE COATINGS AND PROCESSES FOR PRODUCING SAME

(71) Applicant: Dow Global Technologies LLC, Midland, MI (US)

(72) Inventors: Mohamed Esseghir, Lawrenceville, NJ (US); Anurima Singh, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 790 days.

(21) Appl. No.: 17/252,666

(22) PCT Filed: May 20, 2019

(86) PCT No.: PCT/US2019/033054
§ 371 (c)(1),
(2) Date: Dec. 15, 2020

(87) PCT Pub. No.: WO2019/240913
PCT Pub. Date: Dec. 19, 2019

(65) Prior Publication Data
US 2021/0151215 A1 May 20, 2021

Related U.S. Application Data

(60) Provisional application No. 62/685,331, filed on Jun. 15, 2018.

(51) Int. Cl.
*H01B 3/44* (2006.01)
*C08L 23/06* (2006.01)
*C08L 23/08* (2006.01)
*H01B 3/30* (2006.01)

(52) U.S. Cl.
CPC .............. *H01B 3/441* (2013.01); *C08L 23/06* (2013.01); *C08L 23/0815* (2013.01); *H01B 3/308* (2013.01); *C08L 2203/202* (2013.01); *C08L 2205/025* (2013.01); *C08L 2207/062* (2013.01); *C08L 2207/066* (2013.01); *C08L 2314/02* (2013.01)

(58) Field of Classification Search
CPC ...................... C08L 2205/025; C08L 2207/062
See application file for complete search history.

(56) References Cited

U.S. PATENT DOCUMENTS

| | | | |
|---|---|---|---|
| 3,645,992 A * | 2/1972 | Elston | ................... C08F 210/16 526/348.3 |
| 5,338,589 A | 8/1994 | Bohm et al. | |
| 6,063,871 A | 5/2000 | Kishine et al. | |
| 7,037,977 B2 | 5/2006 | Miserque et al. | |
| 7,230,054 B2 | 6/2007 | Mavridis et al. | |
| 7,812,094 B2 | 10/2010 | Kvamme et al. | |
| 7,943,700 B2 | 5/2011 | Crowther et al. | |
| 9,181,421 B2 | 11/2015 | Michie, Jr. et al. | |
| 9,512,307 B2 | 12/2016 | Mathur et al. | |
| 2003/0055176 A1 * | 3/2003 | Jacobsen | ................... D01F 6/46 525/240 |
| 2004/0062942 A1 | 4/2004 | Lustiger et al. | |
| 2005/0119413 A1 | 6/2005 | Maziers | |
| 2009/0068429 A1 | 3/2009 | Kmiec et al. | |
| 2010/0056727 A1 | 3/2010 | Lipishan et al. | |
| 2015/0315401 A1 | 11/2015 | Lee | |
| 2015/0357081 A1 | 12/2015 | Mizuno et al. | |
| 2016/0002450 A1 | 1/2016 | Chiba et al. | |
| 2016/0009908 A1 | 1/2016 | Chiba et al. | |
| 2021/0151215 A1 | 5/2021 | Esseghir et al. | |

FOREIGN PATENT DOCUMENTS

| | | |
|---|---|---|
| CN | 101273087 A | 9/2008 |
| CN | 101356225 A | 1/2009 |
| EP | 0517222 A2 | 12/1992 |
| EP | 0789726 | 5/2002 |
| EP | 1730230 B1 | 5/2012 |
| WO | 1996014358 | 5/1996 |
| WO | 1997003124 | 1/1997 |
| WO | 2003099922 | 12/2003 |
| WO | 2007130553 A2 | 11/2007 |
| WO | 2017091996 | 6/2017 |
| WO | 2017166004 | 10/2017 |
| WO | 2018019925 | 2/2018 |
| WO | 2018118741 A2 | 6/2018 |

(Continued)

OTHER PUBLICATIONS

Ge Tie-Jun, "Study and improvement of environmental stress cracking resistance of HDPE cable insulation and jacket material", Shenyang Huagong Xueyuan Xuebao, 2003, pp. 123-125, vol. 7; Issue 2.

(Continued)

*Primary Examiner* — Michael C Miggins

(57) ABSTRACT

Coated conductors having a conductor at least partially surrounded by a polymeric composition. The polymeric composition contains a broad-molecular-weight-distribution high-density ethylene-based polymer and a narrow-molecular-weight-distribution linear-low-density ethylene-based polymer, and has a density of at least 0.95 g/cm³. Also disclosed are processes for preparing the polymeric composition and for making the coated conductors. Further disclosed are articles of manufacture containing the same.

10 Claims, No Drawings

(56) References Cited

FOREIGN PATENT DOCUMENTS

| WO | WO-2018226311 A1 | * | 12/2018 | ............. C08L 23/06 |
|---|---|---|---|---|
| WO | 2019240913 | | 5/2021 | |

OTHER PUBLICATIONS

Zhang, "Short Chain Branches Distribution Characterization of Ethylene/1-Hexene Copolymers by Using TREF + 13C-NMR and TREF + SC Methods", Macromolecular Symposia, 2012, pp. 63-71, vol. 312.

Office Action from corresponding Japanese Application No. 2020-570054 dated Jun. 20, 2023.

Report Letter from corresponding Indian Application No. 202017055820 dated Oct. 16, 2023.

Office Action from Corresponding Chinese Application No. 201980039349.7 dated Feb. 9, 2022.

Office action from corresponding Korean Application No. 2020-7037299 dated Apr. 3, 2024.

\* cited by examiner

POLYMERIC COMPOUNDS FOR CABLE COATINGS AND PROCESSES FOR PRODUCING SAME

BACKGROUND

Cables, such as power cables or communication cables, are a type of conductor which include an inner conducting element such as a metal wire or a glass fiber, and one or more outer layers for shielding and protecting purposes. The outermost layer of the cable is a protective layer typically referred to as the outer sheath or outer jacket.

Ethylene-based polymers are known for the manufacture of cable jackets. Ethylene-based polymers for use in cable jackets should possess good processability, such as good extrusion properties at broad processing temperature ranges. Furthermore, such ethylene-based cable jackets should generally possess good mechanical properties. However, cable-jacket compounds made from solution-phase polymerized ethylene-based resins ("SP resins") do not process well on extrusion equipment resulting in unacceptable surface smoothness at typical extrusion line speed when compared to equivalent compounds based on broader molecular weight distribution ("MWD") gas-phase polymerized resins ("GP resins").

Therefore, it is desirable to diversify and broaden the types of polymeric resins available for use in cable jacket applications while maintaining both suitable processability and suitable mechanical and performance properties.

SUMMARY

One embodiment is a coated conductor, comprising:
  a conductor; and
  a polymeric composition at least partially surrounding the conductor,
  wherein the polymeric composition comprises:
    a broad-molecular-weight-distribution ("broad-MWD") high-density ethylene-based polymer, and
    a narrow-molecular-weight-distribution ("narrow-MWD") linear-low-density ethylene-based polymer,
  wherein the broad-MWD high-density ethylene-based polymer is present in the polymer composition in an amount of at least 50 weight percent based on the entire weight of the polymeric composition,
  wherein the narrow-MWD linear-low-density ethylene-based polymer is present in the polymeric composition in an amount of at least 20 weight percent based on the entire weight of the polymeric composition,
  wherein the polymeric composition has a density of at least 0.95 g/cm$^3$.

Another embodiment is a process for producing a conductor jacket, the process comprising:
  blending a broad-molecular-weight-distribution ("broad-MWD") high-density ethylene-based polymer with a narrow-molecular-weight-distribution ("narrow-MWD") linear-low-density ethylene-based polymer to form a polymeric composition; and
  extruding at least a portion of the polymeric composition over a conductor at a rate greater than 1.02 meters per second thereby forming the conductor jacket,
  wherein the broad-MWD high-density ethylene-based polymer is present in the polymer composition in an amount of at least 50 weight percent based on the entire weight of the polymeric composition,
  wherein the narrow-MWD linear-low-density ethylene-based polymer is present in the polymeric composition in an amount of at least 20 weight percent based on the entire weight of the polymeric composition,
  wherein the polymeric composition has a density of at least 0.95 g/cm$^3$.

DETAILED DESCRIPTION

Various embodiments of the present disclosure concern polymeric compositions for use in coated conductors such as cables. The polymeric composition comprises a broad-molecular-weight-distribution ("broad-MWD") high-density ethylene-based polymer and a narrow-molecular-weight-distribution ("narrow-MWD") linear-low-density ethylene-based polymer. The polymeric composition can further comprise one or more additives.

Broad-MWD Ethylene-Based Polymer

As noted above, the polymeric composition of the present disclosure comprises a broad-MWD ethylene-based polymer. As used herein, the term "ethylene-based polymer" denotes a polymer that contains more than 50 weight percent polymerized ethylene monomer (based on the total weight of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Non-limiting examples of ethylene-based polymers (polyethylene) include low-density polyethylene ("LDPE"), linear-low-density polyethylene ("LLDPE"), ultra-low-density polyethylene ("ULDPE"), very-low-density polyethylene ("VLDPE"), multi-component ethylene-based copolymer ("EPE"), ethylene/α-olefin multi-block copolymers (also known as olefin block copolymer ("OBC")), single-site catalyzed linear-low-density polyethylene ("m-LLDPE"), substantially linear, or linear, plastomers/elastomers, medium-density polyethylene ("MDPE"), and high-density polyethylene ("HDPE"). Generally, polyethylene may be produced in gas-phase fluidized bed reactors, liquid-phase slurry process reactors, or liquid-phase solution process reactors, using a heterogeneous catalyst system (such as Ziegler-Natta catalyst), a homogeneous catalyst system comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

The term "broad-MWD" is used herein to denote a polymer that has an $I_{21}/I_2$ melt index ratio of at least 55. In various embodiments the broad-MWD ethylene-based polymer can have an $I_{21}/I_2$ melt index ratio of at least 60, at least 65, or in the range of from 55 to 100, from 55 to 90, from 60 to 80, or from 65 to 75. Melt indices are determined according to ASTM D1238, with $I_{21}$ being determined using a 21.6 kg weight at 190° C., and $I_2$ being determined using a 2.16 kg weight at 190° C.

The broad-MWD ethylene-based polymer useful herein is a high-density ethylene-based polymer ("HDPE"). HDPEs are ethylene-based polymers having densities greater than 0.940 g/cm$^3$, as determined according to ASTM D792. In one or more embodiments, the broad-MWD HDPE can have a density of at least 0.945 g/cm$^3$, at least 0.950 g/cm$^3$, in the range of from 0.950 to 0.985 g/cm$^3$, in the range of from 0.955 to 0.970 g/cm$^3$, in the range of from 0.955 to 0.965 g/cm$^3$, or in the range of from 0.960 to 0.963 g/cm$^3$.

In various embodiments, the broad-MWD HDPE can have an $I_2$ melt index ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min, as determined according to ASTM D-1238 (190° C./2.16 kg). The broad-MWD HDPE can have an $I_{21}$ melt index ranging from 40 g/10 min, or 45 g/10 min, or 50 g/10 min, or 55 g/10 min up to 80 g/10 min, 75 g/10 min, 70 g/10 min, 65 g/10 min, or 60 g/10 min.

In various embodiments, the broad-MWD HDPE is a unimodal polymer. A "unimodal polymer" is a polymer that has one distinct peak in a gel permeation chromatography ("GPC") showing the molecular weight distribution.

Broad-MWD HDPEs suitable for use herein can be prepared by any known or hereafter discovered methods in the art for preparing a polyethylene having the above-described characteristics. In various embodiments, the broad-MWD HDPE can be prepared by gas-phase polymerization using a chromium oxide catalyst.

An example of a commercially available broad-MWD HDPE includes, but is not limited to, UNIVAL™ DMDA-6400 NT 7, available from The Dow Chemical Company, Midland, MI, USA.

Narrow-MWD Ethylene-Based Polymer

As noted above, the polymeric composition of the present disclosure comprises a narrow-MWD ethylene-based polymer. The term "narrow-MWD" is used herein to denote a polymer that has an $I_{21}/I_2$ melt index ratio of 50 or less. In various embodiments, the narrow-MWD ethylene-based polymer can have an $I_{21}/I_2$ melt index ratio of 45 or less, 40 or less, or in the range of from 20 to 50, from 25 to 45, from 30 to 40, or from 35 to 40.

The narrow-MWD ethylene-based polymer useful herein is a linear-low-density ethylene-based polymer ("LLDPE"). LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as a $C_3$ to $C_{20}$ α-olefin comonomer. Examples of $C_3$-$C_{20}$ α-olefins include propene, 1-butene, 4-methyl-1-pentene, 1-hexene, 1-octene, 1-decene, 1 dodecene, 1 tetradecene, 1 hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. In an embodiment, the narrow-MWD LLDPE is a copolymer of ethylene and an α-olefin selected from the group consisting of 1-butene, 1-hexene, and 1-octene. In a preferred embodiment, the narrow-MWD LLDPE is a copolymer of ethylene and 1-hexene.

Narrow-MWD LLDPEs suitable for use herein can have a density ranging from 0.910 to 0.925 g/cm³, from 0.915 to 0.925 g/cm³, from 0.917 to 0.923 g/cm³, or from 0.918 to 0.920 g/cm³. Narrow-MWD LLDPEs suitable for use herein can have an I2 melt index ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min. Narrow-MWD LLDPEs can have an $I_{21}$ melt index ranging from 10 g/10 min, or 15 g/10 min, or 20 g/10 min, or 25 g/10 min, or 30 g/10 min, up to 50 g/10 min, 45 g/10 min, or 40 g/10 min.

In various embodiments, the narrow-MWD LLDPE is a unimodal polymer.

Narrow-MWD LLDPEs suitable for use herein can be prepared by any known or hereafter discovered methods in the art for preparing a polyethylene having the above-described characteristics. In various embodiments, the narrow-MWD LLDPE can be prepared by solution-phase polymerization using a Ziegler-Natta catalyst.

An example of a commercially available narrow-MWD LLDPE (ethylene/1-hexene copolymer) includes, but is not limited to, DOWLEX™ 2645G, available from The Dow Chemical Company, Midland, MI, USA.

Polymeric Composition

As noted above, a polymeric composition is provided that comprises a broad-MWD high-density ethylene-based polymer and a narrow-MWD linear-low-density ethylene-based polymer. The broad-MWD HDPE can be present in the polymeric composition in an amount of at least 50 weight percent ("wt %"), or in the range of from 50 to 70 wt %, or from 52 to 67 wt %, based on the entire weight of the polymeric composition. The narrow-MWD LLDPE can be present in the polymeric composition in an amount of at least 25 wt %, or in the range of from 25 to 45 wt %, or from 28 to 42 wt %.

The polymeric composition can further contain one or more additives customarily included in cable jacket formulations. In various embodiments, the polymeric composition can comprise carbon black, which may be present in an amount from 1 wt %, or 2 wt %, or 3 wt %, or 5 wt % to 7 wt %, or 9 wt %, or 10 wt % carbon black. A nonlimiting example of a suitable carbon black is DFNA-0037BK. Additional nonlimiting examples of suitable additives include antioxidants, colorants, ultra violet (UV) absorbers or stabilizers, anti-blocking agents, reinforcing agents, flame retardants, compatibilizers, plasticizers, fillers, processing aids, and combinations thereof.

In an embodiment, the polymeric composition includes an antioxidant. Nonlimiting examples of suitable antioxidants include phenolic antioxidants, thio-based antioxidants, phosphate-based antioxidants, and hydrazine-based metal deactivators. In a further embodiment, the polymeric composition includes an antioxidant, such as LOWINOX™ TBM-6, present in an amount from 0.1 wt %, or 0.2 wt % to 0.3 wt % based on the total weight of the polymeric composition.

In an embodiment, the polymeric composition includes a filler. Nonlimiting examples of suitable fillers include calcium carbonate, zinc oxide, zinc borate, zinc molybdate, zinc sulfide, organo-clay, and combinations thereof. The filler may or may not have flame retardant properties.

In an embodiment, the polymeric composition includes a processing aid. Nonlimiting examples of suitable processing aids include oils, organic acids (such as stearic acid), and metal salts of organic acids (such as zinc stearate). In a further embodiment, the polymeric composition includes a processing aid, such as DYNAMAR FX 5912, present in an amount from 0.01 wt %, or 0.02 wt %, to 0.1 wt %, or 0.05 wt %, based on total weight of the polymeric composition.

In an embodiment, the blend component is void of, or is otherwise free of, propylene.

The polymeric composition can be prepared by any polymer compounding methods known or hereafter discovered in the art. In an embodiment, the polymeric composition can be prepared by blending the broad-MWD HDPE, the narrow-MWD LLDPE, and any one or more of the above-described additives. In an embodiment, the blending occurs by way of melt blending. "Melt blending" is a process whereby at least two components are combined or otherwise mixed together, and at least one of the components is in a melted state. The melt blending may be accomplished by way of batch mixing, extrusion blending, extrusion molding, and any combination thereof.

The resulting polymeric composition can have a density of at least 0.95 g/cm$^3$, in the range of from 0.951 to 0.965 g/cm$^3$, from 0.953 to 0.960 g/cm$^3$, or from 0.953 to 0.958 g/cm$^3$.

The resulting polymeric composition can have an I$_2$ melt index in the range of from 0.1 to 2 g/10 min, from 0.2 to 1.5 g/10 min, or 0.5 to 1.0 g/10 min. Additionally, the polymeric composition can have an I21 melt index in the range of from 35 to 60 g/10 min, or from 40 to 55 g/10 min. The polymeric composition can have an I$_{21}$/I$_2$ melt index ratio in the range of from 30 to 80, from 35 to 75, from 40 to 70, or from 45 to 65.

The resulting polymeric composition can have a tensile strength in the range of from 20 to 40 megapascals ("MPa"), or from 15 to 35 MPa. Additionally, the resulting polymeric composition can have a tensile elongation in the range of from 700 to 1,100 percent, or from 800 to 1,000 percent. Tensile properties are determined according to the test method detailed in the Test Methods section, below.

The resulting polymeric composition can have an F20 environmental stress crack resistance ("ESCR") of at least 500 hours, at least 550 hours, at least 600 hours, at least 650 hours, or at least 700 hours. ESCR is determined according to the test method detailed in the Test Methods section, below.

Coated Conductor

As noted above, the above-described polymeric composition can be used in making a coated conductor. The process includes extruding the polymeric composition over a conductor (or an interceding layer on the conductor) at a rate greater than 1.02 meters per second (m/s) (200 feet per minute (ft/min)). The resulting conductor coating can have a surface smoothness of less than 80 μ-inches, less than 70 μ-inches, less than 60 μ-inches, less than 50 μ-inches, less than 40 μ-inches, less than 30 μ-inches, less than 20 μ-inches, or less than 15 μ-inches, where a lower smoothness value indicates better surface smoothness. Additionally, the resulting conductor coating can have a surface smoothness in the range of from 10 to 80 μ-inches, from 10 to 50 μ-inches, or from 13 to 35 μ-inches.

The extrusion step is performed by an extruder. The extruder has a crosshead die, which provides the desired layer (wall or coating) thickness. A nonlimiting example of an extruder, which can be used is the single screw type modified with a crosshead die, cooling through and continuous take-up equipment. A typical single screw type extruder can be described as one having a hopper at its upstream end and a die at its downstream end. The hopper feeds into the barrel, which contains a screw. At the downstream end, between the end of the screw and the die is a screen pack and a breaker plate. The screw portion of the extruder is considered to be divided up into three sections, the feed section, the compression section, and the metering section, and multiple heating zones from the rear heating zone to the front heating zone with the multiple sections running from upstream to downstream. The length to diameter ratio of the barrel is in the range of 16:1 to 30:1. Grooved barrel extruders or twin screw extruders can also be employed in the core coating process. The jacketing extrusion process can take place at temperatures in the range from 160° C., or 180° C., or 200° C. to 220° C., or 240° C., or 260° C. The crosshead die distributes the polymeric composition in a flow channel such that the melted polymeric composition exits with a uniform velocity and is applied to the conductor. In this way, the blending (melt blending) and the extrusion are performed in the same, single extruder. The conductor passes through the center of the crosshead, and as it exits, a uniform layer of the blend component is circumferentially applied using either pressure, or semi-pressure of tube-on cooling. One or more layers of the polymeric composition (or other material) can be applied using a multiple crosshead. The coated conductor is then cooled in a water trough sufficiently to prevent deformation of the applied blend component layer on the take-up reel, yielding a conductor jacket.

Melt blending may occur sequentially before the extrusion. Alternatively, melt blending may occur simultaneously, or substantially simultaneously with the extrusion (i.e., melt blending and extrusion occurring in the same extruder). The carbon black may be added during the melt blending and/or during the extrusion.

The extrusion rate is greater than 1.02 m/s (>200 ft/min). In an embodiment, the extrusion rate is from greater than 1.02 m/s, or 1.14 m/s, or 1.27 m/s, or 1.40 m/s, to 1.52 m/s, or 1.65 m/s.

In an embodiment, the cable jacket composed of the blend component has a thickness from 0.508 mm, or 0.762 mm, or 1.016 mm, or 1.27 mm to 1.524 mm, or 1.778 mm, or 2.032 mm, or 2.286 mm, or 2.54 mm.

The present process utilizing the two-polymer polymeric composition advantageously provides improved processability (namely, the ability to extrude at line speeds greater than 1.02 m/s), while simultaneously achieving acceptable surface smoothness (30-80 μ-inch) for conductor jacketing while improving tensile strength and tensile elongation for the jacket. Additionally, the two-polymer polymeric composition exhibits improved ESCR relative to the broad-MWD HDPE resin alone, or even blends of the broad-MWD HDPE with low levels (e.g., less than 20 wt %) of the narrow-MWD LLDPE.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

A "conductor" is one or more wire(s), or one or more fiber(s), for conducting heat, light, and/or electricity. The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath. A "cable" is a conductor whereby two or more wires, or two or more optical fibers, are bound together, optionally in a common insulation covering. The individual wires or fibers inside the covering may be bare, covered, or insulated. Combination cables may contain both electrical wires and optical fibers. The cable can be designed for low, medium, and/or high voltage applications.

A "jacket" is the outermost coating on a conductor.

"Linear-low-density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc to 0.925 g/cc. Nonlimiting examples of LLDPE include TUFLIN™ polyethylene resins (available from The Dow Chemical Company), DOWLEX™ polyethylene resins (available from the Dow Chemical Company), and MARLEX™ polyethylene resins (available from Chevron Phillips).

Melt index $I_{21}/I_2$ or "$I_{21}/I_2$ ratio." The ratio $I_{21}/I_2$ is an indirect measure of the viscosity ratio at high shear rates and low shear rates and is indicative of shear thinning behavior which is related to both molecular weight distribution as well as the presence of long chain branching, each of which significantly affect processability. In general, polyethylene containing long chain branching possesses high melt strength and exhibits low viscosity under high shear rate conditions, permitting high processing rates compared to polyethylene with little, or no, long chain branching.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

By way of example, and not by limitation, examples of the present disclosure are provided.

EXAMPLES

Test Methods

Density. Density is measured in accordance with ASTM D792 with values reported in grams per cubic centimeter (g/cc or g/cm³).

Environmental Stress Crack Resistance. Determine ESCR according to ASTM D1693 in 10% Igepal solution ast 50° C. and 75 mils.

Melt Index. Determine melt index according to ASTM D1238, with 121 being determined using a 21.6 kg weight at 190° C., $I_{10}$ being determined using a 10 kg weight at 190° C., 12 being determined using a 2.16 kg weight at 190° C., and $I_{0.5}$ being determined using a 0.5 kg weight at 190° C.

Cyclic Shrinkback. Cyclic temperature shrinkage is conducted on wire specimen (with the conductor removed) conditioned in an oven at a rate of 0.5° C./min temperature ramp from 40° C. to 100° C., held at 100° C. for 60 minutes, and then the temperature is ramped back to 40° C. at a rate of 0.5° C./min, and held at 40° C. for 20 minutes. The temperature cycle is repeated for five cycles prior to shrinkage measurement, which is conducted using a ruler (precision of 1/16 inch (0.0625 inch or 1.59 mm). The test method is consistent with IEC 60811-503 (shrinkage test for sheaths).

Surface smoothness. The surface smoothness of a conductor jacket is measured according to ANSI 1995 via a Surftest SV-400 Series 178 Surface Texture Measuring Instrument. A wire sample is placed in a V-Block and the stylus (10 urn) is lowered down to a specific start position (about 1 gram force is applied to wire). At a fixed rate of 2 (millimeter per second) the stylus is moved in the transverse direction taking measurements. Four readings per wire sample and four samples are tested which are then averaged with values reported in μ-inch.

Tensile properties. The present compositions can be characterized by their tensile strength at break (in megapascals, MPa) and elongation at break (%) ("TE"). Tensile strength ("TS") and elongation at break are measured in accordance with the ASTM D638 testing procedure on compression molded samples prepared according to ASTM D4703. Elongation at break, or elongation to break, is the strain on a sample when it breaks, expressed as a percent.

Materials

The materials used in the following Examples are provided in Table 1 below.

TABLE 1

Materials

| Material | Description | Density (g/cc) | $I_{0.5}$* | $I_2$* | $I_{10}$* | $I_{21}$* | $I_{10}/I_{0.5}$ | $I_{21}/I_2$ | Source |
|---|---|---|---|---|---|---|---|---|---|
| DOWLEX ™ 2645G | Narrow-MWD SP LLDPE | 0.919 | 0.20 | 0.90 | 9.18 | 35.0 | 45.9 | 38.9 | A |
| UNIVAL ™ DMDA-6400 NT7 | Broad-MWD GP HDPE | 0.961 | 0.07 | 0.80 | 15.34 | 57.0 | 219.1 | 71.3 | A |
| ELITE ™ 5940G | Bimodal SP HDPE | 0.94 | — | 0.85 | — | 61.7 | — | 72.6 | A |
| DGDK-6862 NT | Bimodal SP HDPE | 0.941 | — | 0.8 | — | 52.5 | — | 65.7 | A |
| DGDA-1310 BK | Broad-MWD Bimodal GP HDPE Compound | 0.965 | 0.05 | 0.26 | 6.74 | 28 | 125.4 | 107.7 | A |
| AXELERON ™ FO 6318 BK CPD | Broad-MWD Unimodal GP HDPE Compound | 0.954 | 0.10 | 0.75 | 18.32 | 61.95 | 183.2 | 82.6 | A |
| DFNA-0037 BK | Carbon black masterbatch | 1.21 | — | — | — | — | — | — | A |
| DYNAMAR ™ FX 5912 | Processing aid | 1.93 | — | — | — | — | — | — | B |
| LOWINOX ™ TBM-6 | Antioxidant | 1.1 | — | — | — | — | — | — | C |
| HI-PFLEX ™ 100 | Calcium carbonate | 2.71 | — | — | — | — | — | — | D |

*All melt index values are provided in grams per 10 minutes.
A = The Dow Chemical Company, Midland, MI, USA.
B = 3M Company, Maplewood, MN, USA
C = Addivant USA, LLC, Danbury, CT, USA
D = Minerals Technologies Inc., New York City, NY, USA.

Example 1—Lab-Compounded Samples and Mini Wire Extrusion

Comparative Samples CS1-CS7 and Samples S1-S3 are first mixed in a lab scale Brabender mixer before making wire samples. A brabender mixing bowl with 250 cc capacity and cam type mixing blades are used to melt mix the samples. The mixer temperature is set to 180° C. The mixing process involves first adding the resins into the mixing bowl at a mixing speed of 15 rotations-per-minute (rpm). Both heating zones are set at 180° C. After the resins begin to melt, the carbon black masterbatch, processing aid, and antioxidants are added and mixed at 50 rpm for 6 minutes. The molten material is then removed and placed between mylar sheets and pressed into a sheet using a Wabash compression molding press at room temperature (23° C.). A Berlyn pelletizer is used to pelletize the samples.

Coated wire extrusion is performed on each of the materials using a Brabender Mini-Wire line on 14 gauge copper wire. The machine settings are shown in Table 2, below. The equipment is used to generate samples with a final diameter of approximately 0.125 inches and a wall thickness of approximately 0.03 inches, on 14 AWG solid copper conductor of 1.63 mm (0.064 inch) diameter. After extrusion, surface smoothness is measured with a profilometer.

TABLE 2

Mini-Wire Line Extrusion Parameters

| | |
|---|---|
| Heat Zones 1-4 | 210° C.-230° C. |
| Screw RPM | 30 rpm |
| Line Speed | 6.5-9.0 ft/min |
| Melt Temperature | 250° C. |
| Die Size | 0.125 inches |
| Tubing Tip Size | 0.067 inches |
| Finished Diameter | 0.125 inches |
| Cooling Water Temperature | 35-40° C. |
| Wall Thickness | 0.03 inches |
| Screw (3/4 inch diameter; 25:1 L/D) | General purpose polyethylene type, mixing section Maddox @ the head |

Comparative Samples CS1-CS7 and Samples S1-S3 are prepared using the formulations provided in Table 3 below, and then tested using the Test Methods provided above. All component concentrations noted in Table 3 are provided in weight percent based on the total weight of the sample. Qualitative smoothness is visually determined. Results are provided in Table 3.

TABLE 3

Formulation and Properties of S1-S3 and CS1-CS7

| | CS1 | CS2 | CS3 | CS4 | CS5 | CS6 | CS7 | S1 | S2 | S3 |
|---|---|---|---|---|---|---|---|---|---|---|
| Component: | | | | | | | | | | |
| AXELERON ™ FO 6318 BK CPD | 100 | — | — | — | — | — | — | — | — | — |
| DGDA-1310 BK | — | 100 | — | — | — | — | — | — | — | — |

TABLE 3-continued

Formulation and Properties of S1-S3 and CS1-CS7

|  | CS1 | CS2 | CS3 | CS4 | CS5 | CS6 | CS7 | S1 | S2 | S3 |
|---|---|---|---|---|---|---|---|---|---|---|
| UNIVAL ™ DMDA-6400 NT7 | — | — | — | — | 100 | 84.71 | 75.36 | 65.94 | 56.52 | 52.11 |
| DOWLEX ™ 2645G | — | — | — | — | — | 9.41 | 18.84 | 28.26 | 37.68 | 41.00 |
| ELITE ™ 5940G | — | — | 94.2 | — | — | — | — | — | — | — |
| DGDK-6862 NT | — | — | — | 94.2 | — | — | — | — | — | — |
| DFNA-0037 BK | — | — | 5.66 | 5.66 | — | 5.66 | 5.66 | 5.66 | 5.66 | 5.67 |
| HI-PFLEX ™ 100 | — | — | — | — | — | — | — | — | — | 1 |
| DYNAMAR ™ FX 5912 | — | — | 0.02 | 0.02 | — | 0.02 | 0.02 | 0.02 | 0.02 | 0.02 |
| LOWINOX ™ TBM-6 | — | — | 0.12 | 0.12 | — | 0.2 | 0.12 | 0.12 | 0.12 | 0.2 |
| Properties: | | | | | | | | | | |
| Density (g/cc) | 0.959 | 0.963 | 0.951 | 0.952 | 0.961 | 0.967 | 0.962 | 0.958 | 0.953 | 0.958 |
| Density STD | 0.001 | 0.001 | 0 | 0.001 | 0.002 | 0 | 0 | 0 | 0 | 0 |
| $I_2$ (g/10 min) | 0.652 | 0.26 | 0.7 | 0.606 | 0.8 | 0.9 | 0.65 | 0.656 | 0.868 | 0.96 |
| $I_{21}$ (g/10 min) | 67.49 | 30.04 | 49.68 | — | 57 | — | 53.31 | 42.38 | 44.09 | — |
| $I_{21}/I_2$ | 103.51 | 115.54 | 70.97 | 0.00 | 71.25 | — | 82.02 | 64.60 | 50.79 | — |
| TS (MPa) | 19.9 | 31.8 | 29.7 | 28.8 | 32 | — | — | — | 28.2 | 32.2 |
| TS Improvement vs CS1 (%) | — | — | — | — | — | — | — | — | 42 | 61.8 |
| TE (%) | 664 | 808 | 761 | 704 | 1000 | — | — | — | 847 | 887 |
| TE Improvement vs CS1 (%) | — | — | — | — | — | — | — | — | 28 | 33.6 |
| ESCR, F20 (hours) | <240 | >4800 | >4800 | >4800 | <24 | <24 | <48 | >792 | >4800 | >888 |
| Mini-wire line processing, 6 to 9 ft/min: | | | | | | | | | | |
| Smoothness (µ-inch) | 32.25 | 17.17 | 7.75 | 7.5 | — | — | — | — | 13.95 | 32.42 |
| Qualitative Smoothness | smooth | smooth | smooth | smooth | — | — | — | — | smooth | smooth |
| Cyclic shrinkback (%) | 2.6 | 2.28 | 1.72 | 2.16 | — | — | — | — | 2.2 | 2.51 |
| Pressure head (psi) | 920 | 1450 | 1100 | 1080 | — | — | — | — | 1130 | 1800 |
| Melt temperature (° C.) | 250 | 250 | 250 | 248 | — | — | — | — | 248 | 227 |

Example 2—Pilot-Plant Compounded Samples and Standard Wire Extrusion

Comparative Samples CS8-CS10 and Samples S4-S6 are prepared using a Banbury mixer/melt fed pelletizing extruder compounding line. The Banbury system typically provides very good control of the compounding temperature. A 3-stage mixing cycle with a 175° C. drop temperature is used.

Insulated wire extrusion trials for CS8-CS10 and S4-S6 are completed on a 6.35 cm (2.5 in) Davis Standard wire line. The 6.35 cm Davis Standard wire and cable extruder is equipped with a 24:1 L/D barrel. The extruder is set up with a polyethylene type Maddox mixing head screw with a 3:1 compression ratio. The discharge from this extruder flows through a Guill type 9/32 in×5/8 in adjustable center crosshead and through the specified tubing tip and coating die to shape the melt flow for the sample extrusion. This equipment is used to generate samples with a final diameter of approximately 2.9 mm (0.114 in) and a wall thickness of approximately 0.635 mm (0.025 in) on a 14 American Wire Gauge (AWG) solid copper conductor (1.63 mm/0.064 in diameter).

Comparative Samples CS8-CS10 and Samples S4-S6 are prepared using the formulations provided in Table 4 below, and then tested using the Test Methods provided above. All component concentrations noted in Table 4 are provided in weight percent based on the total weight of the sample. Qualitative smoothness is visually determined. Results are provided in Table 4.

TABLE 4

Formulation and Properties of S4-S6 and CS8-CS10

| | CS8 | CS9 | CS10 | S4 | S5 | S6 |
|---|---|---|---|---|---|---|
| Component: | | | | | | |
| AXELERON ™ FO 6318 BK CPD | 100 | — | — | — | — | — |
| DGDA-1310 BK | — | 100 | — | — | — | — |
| DOWLEX ™ 2645G | — | — | — | 33.79 | 35.67 | 37.55 |
| UNIVAL ™ DMDA-6400 NT7 | — | — | — | 60.08 | 58.2 | 56.32 |
| ELITE ™ 5940G | — | — | 93.68 | — | — | — |
| DFNA-0037 BK | — | — | 6.1 | 5.91 | 5.91 | 5.91 |
| DYNAMAR ™ FX 5912 | — | — | 0.02 | 0.02 | 0.02 | 0.02 |
| LOWINOX ™ TBM-6 | — | — | 0.2 | 0.2 | 0.2 | 0.2 |
| Properties: | | | | | | |
| Density (g/cc) | 0.954 | 0.963 | 0.952 | 0.954 | 0.958 | 0.954 |
| Density STD | 0.001 | 0.001 | 0.003 | 0.003 | 0.002 | 0.003 |
| $I_2$ (g/10 min) | 0.75 | 0.3 | 0.76 | 0.87 | 0.78 | 0.87 |
| $I_{10}$ (g/10 min) | 18.32 | 6.74 | — | — | 10.08 | — |
| $I_{0.5}$ (g/10 min) | 0.10 | 0.05 | — | — | 0.13 | — |
| $I_{21}$ (g/10 min) | 61.95 | 27.19 | 43.6 | 43.97 | 43.87 | 43.75 |
| $I_{21}/I_2$ | 82.60 | 90.63 | 57.37 | 50.54 | 56.24 | 50.29 |
| $I_{10}/I_{0.5}$ | 183.24 | 125.44 | — | — | 77.54 | — |
| TS (MPa) | 20.85 | 27.53 | 32.83 | 31.48 | 31.58 | 31.22 |
| TS Improvement vs CS8 (%) | — | — | — | 51 | 52 | 50 |
| TE (%) | 670 | 718 | 766 | 968 | 935 | 939 |
| TE Improvement vs CS8 (%) | — | — | — | 44 | 40 | 40 |
| ESCR, F20 (hours) | <216 | >1000 | >1000 | >864 | >1000 | >1000 |
| Processing on 2.5" David Standard Wire Extrusion Line, 300 ft/min | | | | | | |
| Smoothness (μ-inch) | 19 | 30 | 110 | 33 | 38 | 36 |
| Qualitative Smoothness | smooth | smooth | rough | smooth | smooth | smooth |
| Pressure head (psi) | 1475 | 1745 | 1544 | 1673 | 1700 | 1700 |
| Motor amps (A) | 30 | 33 | 32 | 34 | 34 | 35 |
| Melt temperature (° C.) | 228 | 242 | 233 | 234 | 235 | 235 |
| Cyclic shrinkback (%) | 2.92 | 2.92 | 2.22 | 2.79 | 2.79 | 2.76 |

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A coated conductor, comprising:
   a conductor; and
   a polymeric composition at least partially surrounding the conductor,
   wherein the polymeric composition comprises:
   (a) a broad-molecular-weight-distribution ("broad-MWD") high-density ethylene-based polymer, wherein the high-density ethylene-based polymer has a melt index ratio ($I_{21}/I_2$) of from 70 to 90 and
   (b) a narrow-molecular-weight-distribution ("narrow-MWD") linear-low-density ethylene-based polymer, wherein the linear-low-density ethylene-based polymer has a melt index ratio ($I_{12}/I_2$) of from 25 to 45,
   wherein the broad-MWD high-density ethylene-based polymer is present in the polymer composition in an amount of at least 50 weight percent based on the entire weight of the polymeric composition,
   wherein the narrow-MWD linear-low-density ethylene-based polymer is present in the polymeric composition in an amount of at least 20 weight percent based on the entire weight of the polymeric composition,
   wherein the polymeric composition has a density of at least 0.95 g/cm³.

2. The coated conductor of claim 1, wherein the polymeric composition exhibits an F20 Environmental Stress Crack Resistance ("ESCR") of at least 500 hours in 10% Igepal solution at 50° C. and 75 mils, according to ASTM D1693.

3. The coated conductor of claim 1, wherein the polymeric composition has a density in the range of from 0.951 g/cm³ to 0.965 g/cm³.

4. The coated conductor of claim 1, wherein the broad-MWD high-density ethylene-based polymer is a high-density polyethylene ("HDPE") having a density in the range of from 0.955 to 0.970 g/cm³ and, wherein the narrow-MWD linear-low-density ethylene-based polymer is a linear-low-density polyethylene ("LLDPE") having a density in the range of from 0.910 to 0.925 g/cm³.

5. The coated conductor of claim 4, wherein the LLDPE is a copolymer of ethylene and 1-hexene prepared with a Ziegler-Natta catalyst.

6. The coated conductor of claim 4, wherein the HDPE is present in the polymeric composition in an amount ranging from 50 to 70 weight percent based on the entire weight of the polymeric composition; wherein the LLDPE is present in the polymeric composition in an amount ranging from 25 to 45 weight percent based on the entire weight of the polymeric composition.

7. A process for producing a conductor jacket, the process comprising:
   blending a broad-molecular-weight-distribution ("broad-MWD") high-density ethylene-based polymer with a narrow-molecular-weight-distribution ("narrow-MWD") linear-low-density ethylene-based polymer to form a polymeric composition, wherein the high-density ethylene-based polymer has a melt index ratio ($I_{21}/I_2$) of from 70 to 90 and the linear-low-density ethylene-based polymer has a melt index ratio ($I_{12}/I_2$) of from 25 to 45; and extruding at least a portion of the polymeric composition over a conductor at a rate greater than 1.02 meters per second thereby forming the conductor jacket, wherein the broad-MWD high-density ethylene-based polymer is present in the polymer composition in an amount of at least 50 weight percent based on the entire weight of the polymeric composition, wherein the narrow-MWD linear-low-density ethylene-based polymer is present in the polymeric composition in an amount of at least 20 weight percent based on the entire weight of the polymeric composition, wherein the polymeric composition has a density of at least 0.95 g/cm$^3$.

8. The process of claim 7, wherein the polymeric composition exhibits an F20 Environmental Stress Crack Resistance ("ESCR") of at least 500 hours in 10% Igepal solution at 50° C. and 75 mils, according to ASTM D1693, wherein the polymeric composition exhibits a surface smoothness in the range of from 10 μ-inch to 80 μ-inch.

9. The process of claim 7, wherein the broad-MWD high-density ethylene-based polymer is a high-density polyethylene ("HDPE") having a density in the range of from 0.955 to 0.970 g/cm$^3$, wherein the narrow-MWD linear-low-density ethylene-based polymer is a linear-low-density polyethylene ("LLDPE") having a density in the range of from 0.910 to 0.925 g/cm$^3$.

10. The process of claim 9, wherein the HDPE is present in the polymeric composition in an amount ranging from 50 to 70 weight percent based on the entire weight of the polymeric composition; wherein the LLDPE is present in the polymeric composition in an amount ranging from 25 to 45 weight percent based on the entire weight of the polymeric composition.

* * * * *